(12) United States Patent
Kubota et al.

(10) Patent No.: US 11,777,099 B2
(45) Date of Patent: Oct. 3, 2023

(54) ELECTRODE, METHOD FOR PRODUCING SAID ELECTRODE, AND ELECTRICITY STORAGE DEVICE PROVIDED WITH SAID ELECTRODE

(71) Applicant: NIPPON CHEMI-CON CORPORATION, Tokyo (JP)

(72) Inventors: Satoshi Kubota, Tokyo (JP); Shuichi Ishimoto, Kanagawa (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 581 days.

(21) Appl. No.: 17/049,292

(22) PCT Filed: May 13, 2019

(86) PCT No.: PCT/JP2019/018976
§ 371 (c)(1),
(2) Date: Oct. 20, 2020

(87) PCT Pub. No.: WO2019/221075
PCT Pub. Date: Nov. 21, 2019

(65) Prior Publication Data
US 2023/0040413 A1    Feb. 9, 2023

(30) Foreign Application Priority Data
May 14, 2018   (JP) ................... 2018-093383

(51) Int. Cl.
*H01M 4/62*   (2006.01)
*H01M 4/04*   (2006.01)
(52) U.S. Cl.
CPC .......... *H01M 4/625* (2013.01); *H01M 4/0433* (2013.01)

(58) Field of Classification Search
CPC ............................ H01M 4/625; H01M 4/0433
USPC ........................................................ 429/232
See application file for complete search history.

(56) References Cited

U.S. PATENT DOCUMENTS

| | | | |
|---|---|---|---|
| 2009/0142665 A1* | 6/2009 | Sheem | H01M 4/386 252/182.1 |
| 2013/0303682 A1 | 11/2013 | Konda et al. | |
| 2016/0149206 A1* | 5/2016 | Liu | H01M 4/485 252/182.1 |
| 2016/0315322 A1* | 10/2016 | Kubota | H01M 4/625 |
| 2016/0322634 A1* | 11/2016 | Korchev | H01M 10/06 |

(Continued)

FOREIGN PATENT DOCUMENTS

| | | |
|---|---|---|
| CN | 103360863 | 10/2013 |
| EP | 2650338 | 10/2013 |

(Continued)

*Primary Examiner* — James M Erwin
(74) *Attorney, Agent, or Firm* — SNELL & WILMER LLP

(57) ABSTRACT

A storage device having excellent cycle lifetime, an electrode used in this storage device, and a production method of the electrode are provided. An electrode comprising an active material and a conductive carbon including oxidized carbon. A surface of the active material is covered by the conductive carbon. A Raman spectrum of the active material covered by the conductive carbon includes a peak intensity (a) derived from the active material and a peak intensity (b) of D-band derived from the conductive carbon. A peak intensity ratio (b)/(a) between the peak intensity (a) and the peak intensity (b) is 0.25 or more.

10 Claims, 2 Drawing Sheets

(56) References Cited

U.S. PATENT DOCUMENTS

2017/0200950 A1* 7/2017 Gulas .................. H01M 4/0404
2019/0372151 A1* 12/2019 Zhamu .................. H01M 4/133

FOREIGN PATENT DOCUMENTS

| JP | 2015-79678 | 4/2015 |
| JP | 2015-79680 | 4/2015 |
| JP | 2015-79681 | 4/2015 |

* cited by examiner

ELECTRODE, METHOD FOR PRODUCING SAID ELECTRODE, AND ELECTRICITY STORAGE DEVICE PROVIDED WITH SAID ELECTRODE

TECHNICAL FIELD

The present disclosure relates to an electrode, a production method of said electrode, and a storage device including said electrode.

PRIOR ART

Storage devices, such as secondary batteries, electric double layer capacitors, redox capacitors, and hybrid capacitors, are devices studied for wide application such as power sources for information devices like mobile phones and laptops, drive power source and energy recovery system for motors of low pollution vehicles like electric cars and hybrid cars. Higher performance and downsizing of these storage devices are requested, and among them, improvement in cycle lifetime is desired.

In the electrode utilized in the storage devices, a method for improving the cycle characteristic by covering a part or all of the surface of the active material particles with the conductive carbon particles to suppress the side reaction of the active material and the electrolyte solution for improving the cycle characteristic is known.

CITATION LIST

Patent Document

Patent document 1: Japanese Laid-Open Publication: JP 2004-134304
Patent document 2: Japanese Laid-Open Publication: JP 2009-35598
Patent document 3: Japanese Laid-Open Publication: JP H11-283623

SUMMARY

Problem to be Solved by the Invention

However, since it was hard to cover the surface of the active materials with general conductive carbon, sufficiently satisfactory cycle lifetime has not been obtained.

The objective of the present disclosure is to provide a storage device having excellent cycle lifetime, an electrode used in said storage device, and a production method of said electrode.

Means for Solving the Problem

The inventors have well studied and found that, by covering the surroundings of the active material with the conductive carbon including oxidized carbon, the surroundings of further more active materials can be covered by the conductive carbon including the oxidized carbon. It is discovered that when the electrode of the storage device is configured by using the electrode materials including the active materials covered by the conductive carbon including the oxidized carbon, the above objective is achieved, and the invention is completed.

Furthermore, although it is hard to measure the state of surroundings of the active material covered by the conductive carbon, the inventors have measured and assumed the state by measuring the Raman spectrum of the active materials covered by the oxidized conductive carbon. The electrode according to the present disclosure includes an active material and a conductive carbon including oxidized carbon, in which a surface of the active material is covered by the conductive carbon, a Raman spectrum of the active material covered by the conductive carbon has a peak intensity (a) derived from the active material and a peak intensity (b) of D-band derived from the conductive carbon, and a peak intensity ratio (b)/(a) between the peak intensity (a) and the peak intensity (b) is 0.25 or more.

The peak intensity ratio (b)/(a) may be 0.70 or more.

A Raman shift amount of the peak intensity (b) of D-band derived from the conductive carbon may be 1300 $cm^{-1}$ to 1400 $cm^{-1}$.

The conductive carbon may be a mixture of at least oxidized conductive carbon, and a conductive carbon other than the oxidized conductive carbon.

A storage device including above electrode is also an aspect of the present disclosure.

Furthermore, a production method including a first process of adding a conductive carbon including oxidized carbon to a solvent and wet kneading the conductive carbon and the solvent, a second process of further adding the an active material and wet kneading to obtain a slurry, and a third process of applying the slurry to a current controller and press molding, in which a surface of the active material is covered by the conductive carbon, a Raman spectrum the active material covered by the conductive carbon includes a peak intensity (a) derived from the active material and a peak intensity (b) of D-band derived from the conductive carbon, and a peak intensity ratio (b)/(a) between the peak intensity (a) and the peak intensity (b) is 0.25 or more is also an aspect of the present disclosure

Effect of Invention

According to the present disclosure, an electrode having excellent cycle lifetime, a storage device including an electrode, and a production method of said electrode can be provided.

PREFERRED EMBODIMENT OF INVENTION

Figure 1:
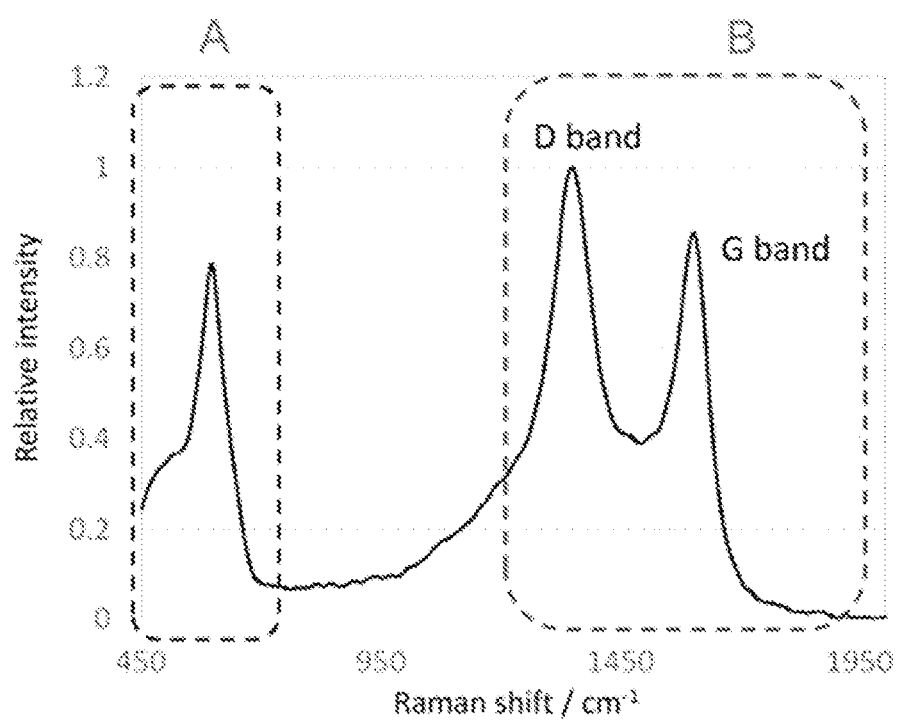
FIG. 1 is a graph illustrating a Raman spectrum of active material covered by oxidized carbon.

In below, embodiments of an electrode and a storage device according to the present disclosure will be described in detail. Note that the present disclosure is not limited to the below described embodiments.

(1) Electrode

An electrode for a storage device of the present disclosure is produced by the production method including the below (A) and (B).

(A) A preparation process of mixing an active material particles and an oxidized carbon to prepare an electrode material in which at least a part of the oxidized carbon is changed into paste and is attached to a surface of the active material particles.

(B) A pressurization process of forming an active material layer on a current collector by the electrode material and applying a pressure to said active material layer.

The oxidized carbon is changed into paste and is attached to the surface of the active material particles by the process (A). Then, the pasty oxidized carbon spreads across the surface of the active material and covers a part or all of the surface of the active material particles by the pressure of the process (B). In other words, the surface area of the active material covered by the oxidized carbon becomes large by the process (B). A state of the active material covered by the conductive carbon can be evaluated by the Raman spectrum of the active material covered by the conductive carbon. The active material covered by the conductive carbon has a peak intensity (a) derived from the active material and a peak intensity (b) of D-band derived from the oxidized conductive carbon, and a peak intensity ratio (b)/(a) between the peak intensity (a) and the peak intensity (b) set to be 0.25 or more.

(1-1) Active Material

The active material used in the process (A) is not particularly limited and may be active materials used as positive electrode active materials or negative electrode active materials in the conventional storage devices. These active materials may be a single compound or may be a mixture of two or more compound.

As examples for the active material used as the positive electrode of the secondary battery, firstly, a layered salt type $LiMO_2$, layered $Li_2MnO_3$-$LiMO_2$ solid solution, and spinel type $LiM_2O_4$ (in formulae, M indicates Mn, Fe, Co, Ni, or the combination thereof) may be cited. As particular examples, $LiCoO_2$, $LiNiO_2$, $LiNi_{4/5}Co_{1/5}O_2$, $LiNi_{1/3}Co_{1/3}Mn_{1/3}O_2$, $LiNi_{1/2}Mn_{1/2}O_2$, $LiFeO_2$, $LiMnO_2$, $Li_2MnO_3$—$LiCoO_2$, $Li_2MnO_3$—$LiNiO_2$, $Li_2MnO_3$—$LiNi_{1/3}Co_{1/3}Mn_{1/3}O_2$, $Li_2MnO_3$—$LiNi_{1/2}Mn_{1/2}O_2$, $Li_2MnO_3$—$LiNi_{1/2}Mn_{1/2}O_2$—$LiNi_{1/3}Co_{1/3}Mn_{1/3}O_2$, $LiMn_2O_4$, and $LiMn_{3/2}Mi_{1/2}O_4$ may be cited. Furthermore, sulfur and sulfide such as $LiS_2$, $TiS_2$, $MoS_2$, $FeS_2$, $VS_2$, and $Cr_{1/2}V_{1/2}S_2$, selenide such as $NbSe_3$, $VSe_2$, and $NbSe_3$, oxide such as $Cr_2O_5$, $Cr_3O_8$, $VO_2$, $V_3O_8$, $V_2O_5$, and $V_6O_{13}$, and other composite compound such as $LiNi_{0.8}Co_{0.15}Al_{0.05}O^2$, $LiVOPO_4$, $LiV_3O_8$, $Li_2FeSiO_4$, $Li_2MnSiO_4$, $LiFePO_4$, $LiFe_{1/2}Mn_{1/2}PO_4$ and $Li_3V_2(PO_4)_3$ may be cited.

As examples for the active material used as the negative electrode of the secondary battery, oxide such as $Fe_2O_3$, $MnO$, $MnO_2$, $Mn_2O_3$, $Mn_3O_4$, $CoO$, $Co_3O_4$, $NiO$, $Ni_2O_3$, $TiO$, $TiO_2$, $SnO$, $SnO_2$, $SiO$, $SiO_2$, $RuO_2$, $WO$, $WO_2$, and $ZnO$, metal such as Sn, Si, Al, and Zn, composite compound such as $LiVO_2$, $Li_3VO_4$, and $Li_4Ti_5O_{12}$, and nitride such as $Li_{2.6}Co_{0.4}N$, $Ge_3N_4$, $Zn_3N_2$, and $Cu_3N$ may be cited.

As the active material in the polar electrode of the electric double layer capacitor, carbon material such as activated carbon, graphene, polyvinylidene chloride carbide, and microcrystalline carbon which have large specific surface area may be exemplified. In the hybrid capacitor, the active material used for positive electrode exemplified for the secondary battery may be used for the positive electrode, and in this case, the negative electrode is formed by the polar electrode in which activated carbon, etc. is used. Furthermore, the negative active material used for negative electrode exemplified for the secondary battery may be used for the negative electrode, and in this case, the positive electrode is formed by the polar electrode in which activated carbon, etc. is used. As the positive active material in the redox capacitor, metal oxide such as $RuO_2$, $MnO_2$, and $NiO$ may be exemplified, and the negative electrode is formed by the active material such as $RuO_2$ and the polar material such as activated carbon.

In process (A), although the shape and the diameter of the active material particles mixed with the oxidized carbon are not limited, the average diameter of the active material particles is preferably more than 2 μm and μm or less. This active material particles having relatively large average diameter itself improves the electrode density, and in addition, facilitates the pasting of the oxidized carbon by its pressing force in the mixing process of the active material particles and the oxidized carbon. Furthermore, in the process (B) indicate below, in the process of applying pressure to the active material layer on the current collector, this active material particles having relatively large average diameter appropriately presses the oxidized carbon which at least a part thereof is pasted, and further spreads and densifies the pasty oxidized carbon.

Furthermore, the active material particles is preferably formed by a microscopic particles having the average diameter of 0.01 to 2 μm and a large particles which has the diameter of more than 2 μm and 25 μm or less and which can work as the active material at the same electrode as the microscopic particles. Although it is said that the particles having small diameter is easily agglomerated, since the oxidized carbon attaches not only to the surface of the large particles but also to the surface of the microscopic particles and covers them, the agglomeration of the active material particles can be suppressed, and the mixed state of the active material particles and the oxidized carbon may be uniform. In addition, the large particles facilitate the pasting and densification of the oxidized carbon as described above. Moreover, in the process (B), in the process of applying pressure to the active material layer on the current collector, at least a part of the microscopic particles presses the pasty oxidized carbon, and together with the oxidized carbon, is pressed into and filled in a gap portion formed between the adjacent large particles. The large particles and the microscopic particles are preferably selected to be in the mass ratio of 80:20 to 95:5, and are more preferably selected to be in the mass ratio of 90:10 to 95:5.

(1-2 Oxidized Carbon)

In the electrode of the present disclosure, the oxidized carbon that gives the pasty conductive carbon included in the active material layer is produced from porous carbon powder, ketjen black, furnace black having voids, and carbon having voids such as carbon nanofiber and carbon nanotube. As the carbon source, carbon which has voids and the specific surface area of 300 $m^2$/g measured by BET method is preferably used because it easily becomes the oxidized carbon by the oxidation treatment. Among them, spherical particles such as ketjen black and furnace black having voids are particularly preferable. It is hard to obtain the oxidized carbon from the oxidation treatment of the solid carbon source.

Known oxidation method can be used without any particular limitations to oxidize the carbon source having voids. For example, by oxidizing the carbon source in the solution of acid or hydrogen peroxide, oxidized carbon can be obtained. Nitric acid, mixture of nitric acid and sulfuric acid, and hypochlorous acid aqueous solution, etc., may be used as the acid. Furthermore, the oxidized carbon can be obtained by heating the carbon source in the oxygen containing atmosphere, water vapor, and carbon dioxide. In addition, the oxidized carbon can be obtained by plasma treatment, ultraviolet irradiation, and corona discharging treatment.

When the carbon source having voids is oxidized, the oxidation starts from the surface of the particles, hydroxy group, carboxy group, and ether bond are introduced to the carbon, conjugated double bond of the carbon is oxidized and the carbon single bond is produced, carbon-carbon bond is partially separated, and highly hydrophilic portion is produced in the surface of the particles. This oxidized carbon having hydrophilic portion is easily attached to the surface of the active material particle and effectively suppresses the agglomeration of the active material particles. Accordingly, if the intensity of oxidation is increased, the ratio of the hydrophilic portion in the carbon particles increases, and the oxidized carbon can be obtained in the production process of the electrode. The content of the hydrophilic portion in the oxidized carbon is preferably 10 wt % or more of the entire oxidized carbon. The content of the hydrophilic portion in the oxidized carbon is more preferably 12 wt % or more and 30 wt % or less of the entire oxidized carbon.

The oxidized carbon including the hydrophilic portion of 10 wt % or more of the entire oxidized carbon can be obtained as appropriate by the production method including:
(a) process of treating the carbon source having voids with acid;
(b) process of mixing the oxidized product and a transition metal compound;
(c) process of crushing the obtained mixture to produce a mechanochemical reaction;
(d) process of heating the product after the mechanochemical reaction under the non-oxidizing atmosphere;
(e) process of removing the above described transition metal compound and/or the reaction product thereof from the heated product.

In the process (a), the carbon source having voids, preferably ketjen black, is impregnated with acid and is left. Ultrasonic wave may be irradiated at the time of this impregnation. As the acid, acid such as nitric acid, mixture of nitric acid and sulfuric acid, and hypochlorous acid aqueous solution that is generally used to oxidize the carbon may be used. The impregnation time depends on the concentration of acid and the amount of carbon source, etc., and may be generally five minutes to five hours. The oxidized carbon is sufficiently washed by water, and after being dried, the oxidized carbon is mixed with the transition metal compound in the process (b).

As the transition metal compound added to the carbon source in the process (b), halide of transition metal, inorganic metal salt such as nitrate, sulfate, and carbonate, organic acid such as formate, acetate, oxalate, methoxide, ethoxide, and isopropoxide, or the combinations thereof may be used. These compounds may be used in single or in combination of two or more. Predefined amount of compounds including different transition metal may be mixed and used. Furthermore, compound other than the transition metal, for example, alkaline metal compound may be added together as long as said compound does not affect the reaction. Since the oxidized carbon is mixed and used with the active material particles in the production of the electrode of the storage device, it is preferable to add compound that forms the active material because the contamination of element that would be impurities against the active material can be prevented.

In the process (c), the mixture obtained in the process (b) is crushed, and the mechanochemical reaction is produced. Examples for the mill used in this reaction are a crusher, a ball mill, a bead mill, a rod mill, a roller mill, a stirring mill, a planet mill, a vibration mill, a hybridizer, a mechanochemical complex apparatus, and a jet mill. The crushing time depends on the mill used and the amount of processed carbon, and although the time is not strictly limited, the time is in the range of 3 to 5 minutes in general. The process (d) is performed under non-oxidizing atmosphere such as nitrogen atmosphere and argon atmosphere. The heating temperature and the heating time are selected as appropriate depending on the transition metal used. In the consequent process (e), the transition metal and/or the reaction product thereof are removed from the heated product, for example, by dissolving them in the acid, then the product is sufficiently washed by water and is dried, and the oxidized carbon including hydrophilic portion of 10 wt % or more of the entire oxidized carbon is obtained.

In this production method, in the process (c), the transition metal facilitates the oxidation of the carbon source by the mechanochemical reaction to rapidly advance the oxidation of the carbon source. By the oxidation, the oxidized carbon including hydrophilic portion of 10 wt % or more of the entire oxidized carbon is obtained.

The oxidized carbon including hydrophilic portion of 10 wt % or more of the entire oxidized carbon is can be obtained by performing a strong oxidation to the carbon source having voids, and the oxidation of the carbon source having voids may be facilitated by the method other than the above production method.

The obtained oxidized carbon is used for the production of the electrode of the storage device such as secondary batteries, electric double layer capacitors, redox capacitors, and hybrid capacitors, in the state mixed with the active material that expressed the capacity by the Faraday reaction which involves the giving and receiving of electrons relative to ions in the electrolyte solution of the storage device or the non-Faraday reaction which does not involves the giving and receiving of electrons.

(1-3) Binder

In the process (b), a binder may be mixed in the electrode material when forming the active material layer on the current collector. As the binder, known binders such as polytetrafluoroethylene, polyvinylidene fluoride, tetrafluoroethylene-hexafluoropropylene copolymer, polyvinyl fluoride, and carboxymethyl cellulose may be used. The content of the binder is preferably 1 to 30 wt % of the total amount of the electrode material. If the content is 1 wt % or less, the intensity of the active material layer is not sufficient, and if the content is 30 wt % or more, the adverse effect such as the reduction of the discharge capacity of the electrode and the excessive internal resistance occur. As the solvent for mixing, solvents that does not affect other component in the electrode material, such as N-methylpyrrolidone may be used without limitation. The amount of the solvent is not particularly limited as long as each components in the mixture is uniformly mixed. The binder may be used in the state being dissolved in the solvent. The binder may not be used if the active material layer can be formed on the current collector without the binder.

(1-4) Mass Ratio of Active Material Layer and Oxidized Carbon

To obtain the storage device having high energy density, the mass ratio of the active material layer and the oxidized carbon is preferably 99:10 to 99.5:0.5, and is more preferably 95:5 to 99:1. If the ratio of the oxidized carbon is less than the above range, the conductivity of the active material layer becomes insufficient, and the coverage of the oxidized carbon on the active material layer decreases and the cycle characteristic tends to decease. Furthermore, if the ratio of the oxidized carbon is more than the above range, the electrode density decreases, and the energy density of the storage device tends to decrease.

In the process (A), a conductive carbon other the oxidized carbon, a binder, and a solvent for mixing may be used if necessary to prepare the electrode material in which at least a part of the oxidized carbon is pasty and is attached to the surface of the active material particles. By using solvent, the slurry electrode material can be obtained.

As the other conductive carbon, an oxidized carbon in which the content of the hydrophilic portion in the non-oxidized or oxidized carbon is less than 10 wt % of the entire oxidized carbon may be used. As such oxidized carbons, carbon black such as ketjen black, acetylene black, furnace black, and channel black, fullerene, carbon nanotube, carbon nanofiber, graphene, amorphous carbon, carbon fiber, natural graphite, artificial graphite, graphitized ketjen black, mesoporous carbon, and vapor-grown carbon fiber may be used. A conductive carbon having higher conductivity than the pasty conductive carbon derived from the oxidized carbon is preferably used, and particularly, acetylene black is preferably used. since the oxidized carbon is attached to and covers the surface of the other conductive carbon in addition to the surface of the active material particles, the agglomeration of other conductive carbon can be suppressed. Furthermore, in the below process (B), in the process of applying the pressure to the active material layer on the current collector, the other conductive carbon is densely filled in the gap portion formed between adjacent particles, together with the past spread oxidized carbon. The mass ratio of the oxidized carbon and the other conductive carbon is preferably 3:1 to 1:3 and is more preferably 2.5:1.5 to 1.5 to 2.5. In addition, when the other conductive carbon is used, the mass ratio of the active material particles, and the total amount of the oxidized carbon and the other conductive carbon is preferably 99:10 to 99.5:0.5, and is more preferably 95:5 to 99:1.

(1-5) Process (A)

In the process (A), the active material and the oxidized carbon are used. Furthermore, the conductive carbon other the oxidized carbon, the binder, and the solvent for mixing may be mixed if necessary. At this time, the mixing scheme and the mixing order is not particularly limited.

The process (A) includes the below processes (A1) and (A2).

(A1) first process of adding the conductive carbon including the oxidized carbon to the solvent, and wet mixing them.

(A2) second process of further adding the active material to the mixture, and wet kneading them to obtain the slurry.

In the process (A), the active material particles and the oxidized carbon are wet kneaded. By sufficiently kneading the obtained product with the binder and the solvent if necessary, the slurry electrode material can be obtained. The wet kneading time varies in accordance with the total amount of the mixed active material particles and oxidized carbon, and the used mixing apparatus, and is generally 1 to 60 minutes. Furthermore, the wet kneading scheme for the binder and the solvent is not particularly limited, and the binder and the solvent may be mixed by hands using mortar, or may be mixed by using the known wet kneading apparatus such as stirrer and homogenizer. The mixing time may be short as long as each component in the electrode material is mixed uniformly.

Furthermore, in the process (A), when using the conductive carbon other than the oxidized carbon, all of the active material particles, the oxidized carbon, and the other conductive carbon may be introduced to the mixing apparatus. By sufficiently kneading the binder and the solvent with the product obtained by the dry mixing if necessary, the slurry electrode material can be obtained. In addition, when the process (A) includes the processes (A1) and (A2), the process of mixing the oxidize carbon and the other conductive carbon is provided before the process (A1).

(1-6) Process (B)

In the process (B), the electrode material obtained in the process (A) is applied on the current collector for forming the positive electrode or the negative electrode of the storage device to form the active material layer, the active material layer is dried if necessary, and the pressure is applied to the active material layer by the pressurization treatment to obtain the electrode. The electrode material obtained in the process (A) is molded into the predefined shape and is crimped on the current collector, and then, rolling treatment may be performed. The process (B) may include the third process of applying the slurry obtained in the process (A2) on the current collector and press molding them.

As the current collector for the electrode of the storage device, the conductive material such as platinum, gold, nickel, aluminum, titanium, copper, and carbon may be used. The shape of the current collector may be any shapes such as film, foil, plate, mesh, expand metal, and cylinder. The drying of the active material layer may remove the solvent by decompression or heating if necessary. The pressure applied on the active material layer by the rolling treatment is generally 50000 to 1000000 N/cm$^2$, and is preferably 100000 to 500000 N/cm$^2$. Furthermore, the temperature in the rolling treatment is not particularly limited and may be performed at room temperature or may be performed under heating condition.

In the preferable embodiment of the electrode of the present disclosure, the conductive carbon in the active material layer is present inside pores which is at the gap portion formed between the adjacent active material particles and/or at the surface of the active material particles and which has width of 50 nm or less. Therefore, the coverage of the conductive carbon on the surface of the active material particles is improved, the conductivity of the entire active material layer is improved, and the electrode density is improved. The conductive material, such as carbon black, natural graphite, and carbon nanotube, used as the conductive material in the electrode of the conventional storage device hardly enters inside gap portion with narrow width or pores.

Although the electrode of the present disclosure has the active material layer including densely filled conductive carbon, the impregnation of the electrolyte solution in the storage device into the electrode is not suppressed. In the preferable embodiment of the electrode of the present disclosure, when the pore distribution of the active material layer of the electrode is measured by the mercury injection method, the active material layer had the pores with the diameter of 5 to 40 nm. Theses small pores can be considered to be mainly pores in the conductive carbon which is derived and densified from the oxidized carbon, and have sizes sufficient for the electrolyte solution of the storage device to pass through the conductive carbon and reach the active material particles. Therefore, the conductive carbon in the electrode has sufficient conductivity and does not suppress the impregnation of the electrolyte solution in the storage device.

Moreover, when the storage device is configured using the electrode of the present disclosure, the dissolution of the active material relative to the electrolyte solution is suppressed and the cycle characteristic of the storage device is improved, even though the impregnation of the electrolyte solution of the storage device to the electrode is not suppressed, because it is considered that in the active material layer of the electrode of the present disclosure, the surface of the active material particles are covered by the densely spread oxidized carbon even at inside the pores present at the surface of the active material particles. In the preferable embodiment of the electrode of the present disclosure, the dissolution mount of the active material is reduced for about 40% or more when compared with the conventional case in which the electrode is formed by the conductive material such as acetylene black and the active material particles. Accordingly, the dissolution of the active material is significantly suppressed.

(1-7) State of Surface of Active Material Particles in Electrode

A part or all of the surface of the active material particles in the electrode produce din the process (B) is covered by the oxidized carbon. In view of improving the cycle characteristic of the storage device, it is preferable that more surface of the active material particles is covered. In the present disclosure, the state of the surface of the active material particles are grasped by evaluating the Raman spectrum of the active material covered by the conductive carbon.

The Raman spectrum is a signal obtained by Raman spectroscopy measurement, and the horizontal axis expresses the Raman shift amount and the vertical axis expresses the intensity. The Raman spectrum has an intensity peak derived from each molecule. The intensity peak derived from each molecule expresses different Raman shift amount for each molecule.

FIG. 1 is a figure illustrating the Raman spectrum of the active material covered by the oxidized carbon. In FIG. 1, a laser with the excitation light of 532 nm is used for the measurement of the Raman spectrum. As illustrated in FIG. 1, the Raman spectrum of the active material covered by the oxidized carbon has three peaks regarding the intensity. That is, one intensity peak derived from the active material that appears in the region A and two intensity peaks derived from the oxidized carbon that appear in the region B. The intensity peaks derived from the oxidized carbon belongs to D-band and G-band. Although the intensity peak derived from the active material when NCM (Li(Ni, Co, Mn)$O_2$), LiCoO$_2$, SiO, LiMg$_2$O$_4$ are used as the active material differs depending on the active material, Raman shift amount is 400 cm$^{-1}$ to 700 cm$^{-1}$. Furthermore, the intensity peak of D-band derived from the oxidized carbon has Raman shift amount of 1300 cm$^{-1}$ to 1400 cm$^{-1}$, and the intensity peak of G-band derived from the oxidized carbon has Raman shift amount of 1550 cm$^{-1}$ to 1650 cm$^{-1}$.

The intensity peaks derived from the oxidized carbon in the region B changes in accordance with the amount of the conductive carbon covering the surface of the active material particles. That is, when the intensity peaks derived from the oxidized carbon is large, the oxidized carbon covers much of the surface of the active material and the surface area where the active material is exposed is small. On the other hand, when the intensity peaks derived from the oxidized carbon is small, the oxidized carbon covers few of the surface of the active material and the surface area where the active material is exposed is large. In the state of the surface of the active material based on the Raman spectrum, when the intensity peak derived from the active material is the peak intensity (a) and the intensity peak of D-band derived from the oxidized conductive carbon is the peak intensity (b), the peak intensity ratio (b)/(a) can be expressed by the following formula 1.

[Formula 1]

$$\text{Peak Intensity Ratio } (b)/(a) = \frac{\text{Peak Intensity } (b) \text{ of } D\text{-band derived from Conductive Carbon}}{\text{Peak Intensity } (a) \text{ derived from Active Material}}$$

As described above, when the active material is covered by the oxidized carbon, the state of the oxidized carbon varies depending on the covered surface of the active material particles. Therefore, the values of peak intensities (a) and (b) differ for each particle. This variation effects the peak intensity ratio (b)/(a). To suppress this variation, peal intensities (a) and (b) are measured for a plurality of active material particles and a plurality of the peak intensity ratios (b)/(a) are calculated to make the average value thereof the peak intensity ratio (b)/(a).

The active material particles covered by the oxidized carbon is peeled off from the electrode to measure the peak intensities (a) and (b). The peak intensities (a) and (b) are measured by the following (1) to (5).

(1) partially peel off the active material particles from the electrode to obtain the powder of the active material particles covered by the oxidized carbon.
(2) sandwich the powder from above and below by two slide glasses, lightly press the slide glasses to flatten the powder, and then remove the upper slide glass.
(3) set the slide glass with the powder thereon obtained in (2) on the stage of the microscope.
(4) observe the powder by the microscope and randomly select 10 active material particles.
(5) irradiate laser on the selected 10 active material particles and measure the Raman spectrum.

From the measurement result of the Raman spectrum of 10 active material particles measured by the above scheme, 10 peak intensity ratios (b)/(a) are calculated from 10 peak intensities (a) and (b). Accordingly, the average value of 10 peak intensity ratios (b)/(a) is the peak intensity ratio (b)/(a).

The Raman spectrum of the active material particles covered by the conductive carbon includes the peak intensity (a) derived from the active material and the peak intensity (b) of D-band derived from the oxidized conductive carbon, and the intensity ratio (b)/(a) between the peak intensity (a) and the peak intensity (b) is 0.25 or more. Furthermore, the intensity ratio (b)/(a) may be 0.70 or more in view of better cycle lifetime.

The surface of the active material with the peak intensity ratio (b)/(a) of 0.25 or more is densely covered by the oxidized carbon. By the oxidized carbon covering the surface of the active material, the co-reaction of the active material and the electrolyte solution can be suppressed and the cycle characteristic of the electrode can be improved. Furthermore, by covering the surface of the active material by the oxidized carbon, the fillability of the active material is improved and densification is facilitated. That is, the energy density of the electrode is improved. In addition, by covering the surface of the active material by the oxidized carbon, the contact area of the active material and the oxidized carbon increases. By this, the internal resistance is reduced, and since the conductivity of the entire electrode is improved, the energy density of the storage device is further improved. The mechanism of improving the cycle characteristic, the mechanism of improving the energy density of the electrode, and the mechanism of reducing the internal resistance of the electrode may not limited to the above, however, it can be assumed to be as above.

the peak intensity ratio (b)/(a) can be adjusted by increasing or decreasing the amount of oxidized carbon included in the mixture subjected to the mechanochemical reaction in the process (c), or by increasing or decreasing the mixing time and the frequency when crushing the mixture in the process (A2).

(2) Storage Device

The electrode of the present disclosure is used for the electrode of the storage device such as secondary batteries, electric double layer capacitors, redox capacitors, and hybrid capacitors. The storage device includes one pair of electrodes (positive electrode and negative electrode) and an electrolyte provided therebetween as the required component, and at least one of the positive electrode or the negative electrode is produced by the production method of the present disclosure.

The electrolyte provided between the positive electrode and the negative electrode in the storage device may be the electrolyte solution held in the separator, may be the solid electrolyte, or may be gel electrolyte, and electrolyte used in the conventional storage device can be used without particular limitations. The representative electrolyte is exemplified below. For the lithium ion secondary battery, the electrolyte solution in which the lithium salt such as $LiPF_6$, $LiBF_4$, $LiCF_3SO_3$, and $LiN(CF_3SO_2)_2$ is dissolved in the solvent such as ethylene carbonate, propylene carbonate, butylene carbonate, and dimethyl carbonate is held in the separator such as polyolefin fiber non-woven fabric and glass fiber non-woven fabric. As others, inorganic solid electrolyte such as $Li_5La_3Nb_2O_{12}$, $Li_{1.5}Al_{0.5}Ti_{1.5}(PO_4)_3$, $Li_7La_3Zr_2O_{12}$, and $Li_7P_3S_{11}$, organic solid electrolyte consisting of the composite of lithium salt and polymeric compound such as polyethylene oxide, polymethacrylate, and polyacrylate, and gel electrolyte in which polyvinylidene fluoride, polyacrylonitorile, etc., are absorbed in electrolyte solution may be used. For the electric double layer capacitor and the redox capacitor, the electrolyte solution, in which quaternary ammonium salt such as $(C_2H_5)_4NBF_4$ is dissolve in the solvent such as acrylonitorile and propylene carbonate, is used. For the hybrid capacitor, the electrolyte solution in which lithium salt is dissolved in propylene carbonate, etc., and the electrolyte solution in which quaternary ammonium salt is dissolved in propylene carbonate, etc., are used.

However, when the solid electrolyte or the gel electrolyte are used as the electrolyte between the positive electrode and the negative electrode, in order to ensure the ion conduction path in the active material layer, the electrode material may be prepared by adding the solid electrolyte to each component described above in the process (A).

EXAMPLES

1. Characteristic Comparison by Peak Intensity Ratio (b)/(a)

In the following characteristic comparison, the capacity retention rate at 200 cycles was measured for batteries using six types of electrodes with different peak intensity ratio (b)/(a). Six types of batteries with different peak intensity ratio (b)/(a) were produced as examples 1 to 6 and comparative example 1. Table 1 indicates the peak intensity ratio (b)/(a) of each battery.

TABLE 1

| | Intensity Ratio (b)/(a) |
|---|---|
| Comparative Example 1 | 0.10 |
| Exaple 1 | 0.26 |
| Exaple 2 | 0.50 |
| Exaple 3 | 0.72 |
| Exaple 4 | 0.94 |
| Exaple 5 | 1.68 |

100 g of ketjen black (product name EC300J, from ketjen black international company, BET specific surface are of 800 m²/g) was added to 300 ml of 60% nitric acid, and the obtained solution was irradiated with the ultrasonic wave was for 10 minutes and then was filtered to recover the ketjen black. The recovered ketjen black was washed by water three times and was dried to obtain oxidized ketjen black. 3 g of the oxidized ketjen black, 21.98 g of $Fe(CH_2COO)$, 0.77 g of $Li(CH_2COO)$, 1.10 g of $C_6H_8O_7 \cdot H_2O$, 1.32 g of $CH_3COOH$, 1.31 g of $H_2PO_4$ and 120 ml of distilled water were mixed, and the obtained mixture solution was stirred in the stirrer for 1 hour and then evaporated and dried to solid in the air at 100° C. to collect the mixture. Next, the obtained mixture was introduced into the vibration ball mill apparatus and was crushed for 10 minutes at 20 Hz. The crushed powder was heated under nitrogen atmosphere for three minutes at 700° C., and the composite in which $LiFePO_4$ was supported in the oxidized ketjen black was obtained.

1 g of the obtained composite was added to 100 ml of hydrochloric acid aqueous solution with concentration of 30%, and the obtained solution was irradiated by the ultrasonic wave for 15 minutes to dissolve $LiFePO_4$ in the composite, and the remained solid was filtered, washed by water, and dried. A part of the dried solid was heated in the air until it became 900° C. by TG analysis, and the weight loss was measured. The above processes of dissolving $LiFePO_4$ by hydrochloric acid aqueous solution, filtering, washing by water, and drying were repeated until it was confirmed that the weight loss was 100%, that is, $LiFePO_4$ did not remain to obtained the oxidized carbon in which $LiFePO_4$ was removed.

Next, 0.1 g of the obtained oxidized carbon was added to 20 ml of ammonium aqueous solution with pH of 11, and the ultrasonic wave was irradiated for 1 minute. The obtained solution was left for five hours to precipitate the solid phase portion. After the solid phase portion had been precipitated, the supernatant solution was removed, the remaining portion was dried, and the weight of the dried solid was measured. A weight ratio of a weight, in which the weight of the dried solid is subtracted from the weight 0.1 g of the initial oxidized carbon, relative to the weight 0.1 g of the initial oxidized carbon is the content of "hydrophilic portion" in the oxidized carbon.

Next, the obtained oxidized carbon and acetylene black that is a conductive carbon other than the oxidized carbon were mixed. That is, the obtained oxidized carbon and acetylene black (primary particle diameter of 40 nm) were introduced into the ball mill at the ratio of 1:1 and were dry mixed to obtain a conductive carbon mixture. Then, 4 parts by weight of the obtained conductive carbon mixture, two parts by weight of polyvinylidene fluoride, and appropriate amount of N-methylpyrrolidone were wet mixed, 94 parts by weight of commercially available $LiNi_{0.5}Co_{0.2}O_2$ particles were further added, and the mixture was wet mixed to obtain a slurry. This slurry was applied and dried on the aluminum foil, and then the rolling treatment was performed to obtain an electrode.

Example 2 g of oxidized ketjen black produced by the same method as example 1, 21.98 g of $Fe(CH_3COO)$, 0.77 g of $Li(CH_2COO)$, 1.10 g of $C_6H_8O_7 \cdot H_2O$, 1.32 g of $CH_3COOH$, 1.31 g of $H_2PO_4$ and 120 ml of distilled water were mixed, and the obtained mixture solution was stirred in the stirrer for 1 hour and then evaporated and dried to solid in the air at 100° C. to collect the mixture. Next, the obtained mixture was introduced into the vibration ball mill apparatus and was crushed for 20 minutes at 20 Hz. Afterwards, the electrode was produced from the crushed powder similarly to example 1.

Example 3 g of oxidized ketjen black produced by the same method as example 1, 21.98 g of $Fe(CH_3COO)$, 0.77 g of $Li(CH_2COO)$, 1.10 g of $C_6H_8O_7 \cdot H_2O$, 1.32 g of $CH_3COOH$, 1.31 g of $H_3PO_4$ and 120 ml of distilled water were mixed, and the obtained mixture solution was stirred in the stirrer for 1 hour and then evaporated and dried to solid in the air at 100° C. to collect the mixture. Next, the obtained mixture was introduced into the vibration ball mill apparatus and was crushed for 10 minutes at 30 Hz. Afterwards, the electrode was produced from the crushed powder similarly to example 1.

Example 4 g of oxidized ketjen black produced by the same method as example 1, 21.98 g of $Fe(CH_3COO)$, 0.77 g of $Li(CH_2COO)$, 1.10 g of $C_6H_8O_7 \cdot H_2O$, 1.32 g of $CH_3COOH$, 1.31 g of $H_3PO_4$ and 120 ml of distilled water were mixed, and the obtained mixture solution was stirred in the stirrer for 1 hour and then evaporated and dried to solid in the air at 100° C. to collect the mixture. Next, the obtained mixture was introduced into the vibration ball mill apparatus and was crushed for 20 minutes at 30 Hz. Afterwards, the electrode was produced from the crushed powder similarly to example 1.

Example 5

0.5 g of oxidized ketjen black produced by the same method as example 1, 21.98 g of $Fe(CH_3COO)$, 0.77 g of $Li(CH_2COO)$, 1.10 g of $C_6H_8O_7 \cdot H_2O$, 1.32 g of $CH_3COOH$, 1.31 g of $H_3PO_4$ and 120 ml of distilled water were mixed, and the obtained mixture solution was stirred in the stirrer for 1 hour and then evaporated and dried to solid in the air at 100° C. to collect the mixture. Next, the obtained mixture was introduced into the vibration ball mill apparatus and was crushed for 30 minutes at 30 Hz. Afterwards, the electrode was produced from the crushed powder similarly to example 1.

Comparative Example 1

0.5 g of oxidized ketjen black produced by the same method as example 1, 21.98 g of $Fe(CH_3COO)$, 0.77 g of $Li(CH_2COO)$, 1.10 g of $C_6H_8O_7 \cdot H_2O$, 1.32 g of $CH_3COOH$, 1.31 g of $H_3PO_4$ and 120 ml of distilled water were mixed, and the obtained mixture solution was stirred in the stirrer for 1 hour and then evaporated and dried to solid in the air at 100° C. to collect the mixture. Next, the obtained mixture was introduced into the vibration ball mill apparatus and was crushed for 10 minutes at 20 Hz. Afterwards, the electrode was produced from the crushed powder similarly to example 1.

Lithium ion secondary batteries, in which the electrodes of examples 1 to 5 and comparative example 1 produced as above were used, the electrolyte solution was 1 M of 1:1 solution of ethylene carbonate/diethyl carbonate of $LiPF_6$, and the opposite electrode was lithium, were produced. The obtained batteries were repeatedly charged and discharged in the range of 6.7 to 3.0 V under the condition of 60° C. and the charging and discharging rate of 0.5 C.

Figure 2:
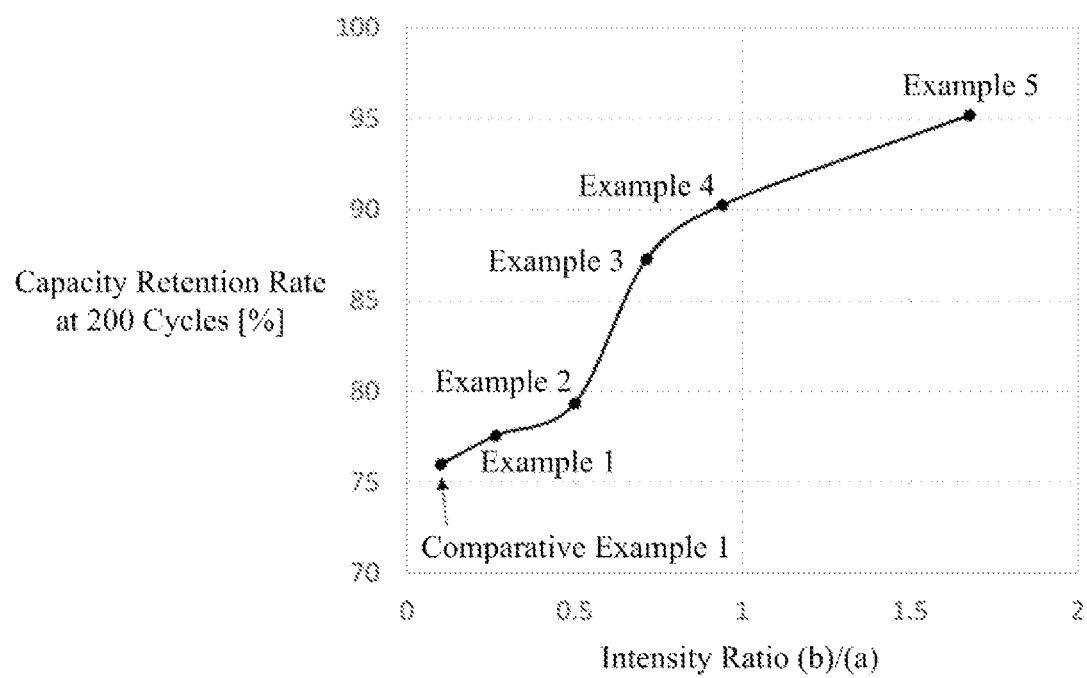
FIG. 2 is a graph illustrating a comparison result of cycle characteristics in examples.

FIG. 2 illustrates the result of the obtained cycle characteristic. In FIG. 2, in comparative example 1, the capacity retention rate at 200 cycles is 76.00%, and in example 1 in which the peak intensity ratio (b)/(a) is 0.26, the capacity retention rate at 200 cycles is 77.57%. That is, by making the peak intensity ratio (b)/(a) larger, the battery which has the electrode with excellent cycle lifetime can be provided.

Furthermore, in example 2 in which the peak intensity ratio (b)/(a) is 0.50, the capacity retention rate at 200 cycles is 79.35%, and in example 3 in which the peak intensity ratio (b)/(a) is 0.71, the capacity retention rate at 200 cycles is 87.28%. That is, it is found that the capacity retention rate at 200 cycles largely changes in example 2 in which the peak intensity ratio (b)/(a) is 0.50 or less and in example 3 in which the peak intensity ratio (b)/(a) is 0.70 or more Therefore, it is found that by making the peak intensity ratio (b)/(a) larger, the capacity retention rate at 200 cycles can be further improved.

2. Characteristic Comparison by Difference in Types of Active Material

In the following characteristic comparison, the capacity retention rate at 200 cycles were measured for the batteries using electrode which uses the active material other than NCM. Batteries using $LiCoO_2$, SiO, and $LiMg_2O_4$ were produced as examples 6 to 8 and comparative example 2 to 4.

Example 6

$LiCoO_2$ particles were used instead of $LiNi_{0.5}Mn_{0.3}Co_{0.2}O_2$ particles in example 3 to form the slurry. This slurry was applied on the aluminum foil and was dried, and then the rolling treatment was performed to obtain the electrode.

Comparative Example 2

$LiCoO_2$ particles were used instead of $LiNi_{0.5}Mn_{0.3}Co_{0.2}O_2$ particles in comparative example 1 to form the slurry. This slurry was applied on the aluminum foil and was dried, and then the rolling treatment was performed to obtain the electrode.

Example 7

$LiMg_2O_4$ particles were used instead of $LiNi_{0.5}Mn_{0.3}Co_{0.2}O_2$ particles in example 3 to form the slurry. This slurry was applied on the aluminum foil and was dried, and then the rolling treatment was performed to obtain the electrode.

Comparative Example 3

$LiMg_2O_4$ particles were used instead of $LiNi_{0.5}Mn_{0.3}Co_{0.2}O_2$ particles in comparative example 1 to form the slurry. This slurry was applied on the aluminum foil and was dried, and then the rolling treatment was performed to obtain the electrode.

Example 8

SiO particles were used instead of $LiNi_{0.5}Mn_{0.3}Co_{0.2}O_2$ particles in example 3 to form the slurry. This slurry was applied on the aluminum foil and was dried, and then the rolling treatment was performed to obtain the electrode.

Comparative Example 4

SiO particles were used instead of $LiNi_{0.5}Mn_{0.3}Co_{0.2}O_2$ particles in comparative example 1 to form the slurry. This slurry was applied on the aluminum foil and was dried, and then the rolling treatment was performed to obtain the electrode.

Lithium ion secondary batteries, in which the electrodes of examples 6 to 8 and comparative examples 2 to 4 produced as above were used, the electrolyte solution was 1 M of 1:1 solution of ethylene carbonate/diethyl carbonate of $LiPF_6$, and the opposite electrode was lithium, were produced. The obtained batteries were repeatedly charged and discharged in the range of 6.7 to 3.0 V under the condition of 60° C. and the charging and discharging rate of 0.5 C.

Table 2 indicates the result of the obtained cycle characteristic.

TABLE 2

|  | Intensity Rate (b)/(a) | Cycle Characteristic (Capacity Retention Rate after 200 Cycles) |
| --- | --- | --- |
| Example 6 | 1.20 | 90.4% |
| Comparative Example 2 | 0.15 | 84.6% |
| Example 7 | 2.01 | 95.2% |
| Comparative Example 3 | 0.20 | 85.3% |
| Example 8 | 0.81 | 81.2% |
| Comparative Example 4 | 0.12 | 62.3% |

In Table 2, in comparative example 2, the capacity retention rate at 200 cycles is 84.6%, and in example 6 in which the peak intensity ratio (b)/(a) is 1.20, the capacity retention rate at 200 cycles is 90.4%. That is, it is found that even when the active material covered by the oxidized carbon is changed from NCM to $LiCoO_2$, by making the peak intensity ratio (b)/(a) larger, the excellent cycle lifetime can be provided.

Furthermore, by comparing comparative example 3 and example 7, it is found that even when the active material covered by the oxidized carbon is changed from NCM to $LiMg_2O_4$, by making the peak intensity ratio (b)/(a) larger, the excellent cycle lifetime can be provided.

In addition, by comparing comparative example 4 and example 8, it is found that even when the active material covered by the oxidized carbon is changed from NCM to SiO, by making the peak intensity ratio (b)/(a) larger, the excellent cycle lifetime can be provided.

As above, even when the active material other than NCM is used as the active material covered by the oxidized carbon, by making the peak intensity ratio (b)/(a) larger, the battery which has the electrode with excellent cycle lifetime can be provided.

The invention claimed is:

1. An electrode comprising an active material and a conductive carbon including oxidized carbon,
   wherein a surface of the active material is covered by the conductive carbon,
   a Raman spectrum of the active material covered by the conductive carbon includes a peak intensity (a) derived from the active material and a peak intensity (b) of D-band derived from the conductive carbon, and
   a peak intensity ratio (b)/(a) between the peak intensity (a) and the peak intensity (b) is 0.25 or more.

2. The electrode according to claim 1, wherein the peak intensity ratio (b)/(a) is 0.70 or more.

3. The electrode according to claim 1, wherein a Raman shift amount of the peak intensity (b) of two D-bands derived from the conductive carbon is 1300 $cm^{-1}$ to 1400 $cm^{-1}$.

4. The electrode according to claim 1, wherein the conductive carbon is a mixture of at least oxidized conductive carbon, and a conductive carbon other than the oxidized conductive carbon.

5. A storage device comprising the electrode according to claim 1.

6. A production method of an electrode comprising:
   a first process of adding a conductive carbon including oxidized carbon to a solvent and wet kneading the conductive carbon and the solvent;
   a second process of further adding an active material and wet kneading to obtain a slurry; and
   a third process of applying the slurry to a current controller and press molding,
   wherein:
   a surface of the active material is covered by the conductive carbon,
   a Raman spectrum the active material covered by the conductive carbon includes a peak intensity (a) derived from the active material and a peak intensity (b) of D-band derived from the conductive carbon, and
   a peak intensity ratio (b)/(a) between the peak intensity (a) and the peak intensity (b) is 0.25 or more.

7. The production method of the electrode according to claim 6, wherein the peak intensity ratio (b)/(a) is 0.70 or more.

8. The electrode according to claim 2, wherein a Raman shift amount of the peak intensity (b) of two D-bands derived from the conductive carbon is 1300 $cm^{-1}$ to 1400 $cm^{-1}$.

9. The electrode according to claim 2, wherein the conductive carbon is a mixture of at least oxidized conductive carbon, and a conductive carbon other than the oxidized conductive carbon.

10. A storage device comprising the electrode according to claim 2.

* * * * *